United States Patent
Gillette et al.

(10) Patent No.: US 10,691,423 B2
(45) Date of Patent: Jun. 23, 2020

(54) TESTING SYSTEMS AND METHODS FOR PERFORMING HVAC ZONE AIRFLOW ADJUSTMENTS

(71) Applicant: Johnson Controls Technology Company, Auburn Hills, MI (US)

(72) Inventors: Theresa N. Gillette, Wichita, KS (US); Tyler P. McCune, El Dorado, KS (US); Jonathan A. Burns, Wichita, KS (US); Shaun B. Atchison, Wichita, KS (US); Shawn A. Hern, Park City, KS (US); Brian D. Rigg, Douglass, KS (US); John W. Uerkvitz, Valley Center, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 18 days.

(21) Appl. No.: 15/958,970

(22) Filed: Apr. 20, 2018

(65) Prior Publication Data

US 2019/0310831 A1    Oct. 10, 2019

Related U.S. Application Data

(60) Provisional application No. 62/652,730, filed on Apr. 4, 2018.

(51) Int. Cl.
*G06F 8/34* (2018.01)
*F24F 11/30* (2018.01)
(Continued)

(52) U.S. Cl.
CPC ............... *G06F 8/34* (2013.01); *F24F 11/30* (2018.01); *F24F 11/52* (2018.01); *F24F 11/745* (2018.01);
(Continued)

(58) Field of Classification Search
CPC ......... G06F 21/6281; G06F 2221/2141; G06F 2221/2149
See application file for complete search history.

(56) References Cited

U.S. PATENT DOCUMENTS 5,344,068 A   9/1994   Haessig
5,860,473 A * 1/1999   Seiden ............... G05D 23/1904
                                                          165/208
(Continued)

FOREIGN PATENT DOCUMENTS

EP      2052190 A1    4/2009
WO   2016182891 A1   11/2016

*Primary Examiner* — Kidest Bahta
(74) *Attorney, Agent, or Firm* — Fletcher Yoder, P.C.

(57) ABSTRACT

A heating, ventilation, and air conditioning (HVAC) system may include a HVAC unit that may control air flow, a first control system that may directly control operation of equipment in the HVAC unit, and a second control system communicatively coupled to the first control system. The second control system may be located in a different zone of a building as compared to the first control system, such that the second control system may receive a request to adjust the air flow output by the HVAC unit and send a command to the first control system based on the request. The command may cause the first control system to adjust the operation of the equipment in the HVAC unit to cause the air flow output by the HVAC unit to be adjusted according to the request.

20 Claims, 7 Drawing Sheets

(51) Int. Cl.
  *F24F 13/14*   (2006.01)
  *F24F 11/74*   (2018.01)
  *F24F 11/52*   (2018.01)
  *G05B 19/042*  (2006.01)
  *F24F 140/40*  (2018.01)
  *F24F 110/40*  (2018.01)
  *F24F 110/10*  (2018.01)

(52) U.S. Cl.
  CPC ........ *F24F 13/1426* (2013.01); *G05B 19/042* (2013.01); *F24F 2110/10* (2018.01); *F24F 2110/40* (2018.01); *F24F 2140/40* (2018.01)

(56) References Cited

U.S. PATENT DOCUMENTS

| | | | |
|---|---|---|---|
| 6,079,626 A * | 6/2000 | Hartman | F24F 3/044 236/13 |
| 7,188,779 B2 | 3/2007 | Alles | |
| 7,354,005 B2 | 4/2008 | Carey et al. | |
| 8,374,725 B1 | 2/2013 | Ols | |
| 8,457,796 B2 | 6/2013 | Thind | |
| 8,788,100 B2 | 7/2014 | Grohman et al. | |
| 9,103,555 B2 | 8/2015 | Zou et al. | |
| 9,122,285 B2 | 9/2015 | Mansfield et al. | |
| 9,188,508 B1 * | 11/2015 | Meyer | G01M 99/005 |
| 9,353,963 B2 | 5/2016 | Kates | |
| 9,494,952 B2 | 11/2016 | Storm et al. | |
| 9,638,433 B2 | 5/2017 | Norrell et al. | |
| 9,689,585 B2 | 6/2017 | Norrell et al. | |
| 2001/0010266 A1 | 8/2001 | Rayburn et al. | |
| 2003/0050737 A1 | 3/2003 | Osann, Jr. | |
| 2008/0033599 A1 | 2/2008 | Aminpour et al. | |
| 2008/0161977 A1 * | 7/2008 | Takach | F24F 13/20 700/277 |
| 2009/0140063 A1 | 6/2009 | Koster et al. | |
| 2010/0082162 A1 | 4/2010 | Mundy et al. | |
| 2010/0307733 A1 * | 12/2010 | Karamanos | F24F 13/04 165/254 |
| 2011/0031322 A1 * | 2/2011 | Zou | F24F 3/0442 236/1 B |
| 2012/0310418 A1 * | 12/2012 | Harrod | G05B 19/042 700/276 |
| 2014/0207291 A1 | 7/2014 | Golden et al. | |
| 2015/0219382 A1 | 8/2015 | Uselton | |
| 2016/0047568 A1 | 2/2016 | Chan et al. | |
| 2016/0123608 A9 * | 5/2016 | Karamanos | F24F 13/04 165/210 |
| 2017/0167747 A1 | 6/2017 | Zhang | |
| 2017/0192402 A1 | 7/2017 | Karp et al. | |

* cited by examiner

TESTING SYSTEMS AND METHODS FOR PERFORMING HVAC ZONE AIRFLOW ADJUSTMENTS

CROSS-REFERENCE TO RELATED APPLICATION

This application is a Non-Provisional application claiming priority to U.S. Provisional Application No. 62/652,730, entitled "TESTING SYSTEMS AND METHODS FOR PERFORMING HVAC ZONE AIRFLOW ADJUSTMENTS," filed Apr. 4, 2018, which is hereby incorporated by reference in its entirety for all purposes.

BACKGROUND

The present disclosure generally relates to heating, ventilation, and air conditioning (HVAC) systems and, more particularly, to control systems that may be implemented in a HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally includes a control system to control and/or to coordinate operation of devices, such as equipment, machines, and sensors. For example, the control system may communicate sensor data and control commands with devices in the HVAC system. In certain cases, the control system may adjust the operational parameters and/or properties of the HVAC system to control the air flow in different zones of a structure (e.g., building). That is, the HVAC system may control the amount of air flow and/or the direction of the air flow into different zones of the structure based on commands received from the control system. Thus, to test the effectiveness of the HVAC system in each zone, a technician may determine whether the HVAC system is providing a target (e.g., sufficient) amount of air flow into each zone and use the control system to control air flow accordingly. Since testing the effectiveness of the HVAC system in multiple zones can prove to be a time-consuming process, improved systems and methods for performing these testing operations are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and air conditioning (HVAC) system may include a HVAC unit that may control air flow, a first control system that may directly control operation of equipment in the HVAC unit, and a second control system communicatively coupled to the first control system. The second control system may be located in a different zone of a building as compared to the first control system, such that the second control system may receive a request to adjust the air flow output by the HVAC unit and send a command to the first control system based on the request. The command may cause the first control system to adjust the operation of the equipment in the HVAC unit to cause the air flow output by the HVAC unit to be adjusted according to the request.

In another embodiment, a method for controlling operation of equipment of a heating, ventilation, and air conditioning (HVAC) system may include using at least one processor to receive a request to adjust an air flow provided to a first zone in a building from the HVAC system, determine one or more zones of the building fluidly coupled to the first zone via ductwork, generate a visualization indicative of one or more combinations of the first zone and the one or more zones, receive a selection of the one or more combinations of the first zone and the one or more zones, and send a command to an HVAC control system to adjust position of one or more dampers based on the selection. The at least one processor may also receive an air flow input associated with the first zone, send the air flow input to the HVAC control system to enable the HVAC control system to adjust an air flow output by the HVAC system based on the air flow input, and store data including the air flow input and the selection of the one or more combinations of the first zone and the one or more zones in a storage component.

In another embodiment, a tangible, non-transitory, computer-readable medium that stores instructions executable by one or more processors of a zone control system in a heating, ventilation, and air conditioning (HVAC) system that, when executed by the one or more processor, cause the one or more processors to receive a request to adjust an air flow output by an HVAC unit of the HVAC system, wherein the HVAC unit is fluidly coupled to a plurality of zones in a building via ductwork and one or more dampers are implemented in the ductwork. The processors may then send a command to an HVAC control system directly communicatively coupled to the HVAC unit based on the request to enable the HVAC control system to adjust an operation of equipment in the HVAC unit to cause the air flow output by the HVAC unit to be adjusted according to the request. The air flow output is associated with a speed of a fan in the HVAC unit and the zone control system is located in a different zone of the building as compared to the HVAC control system.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
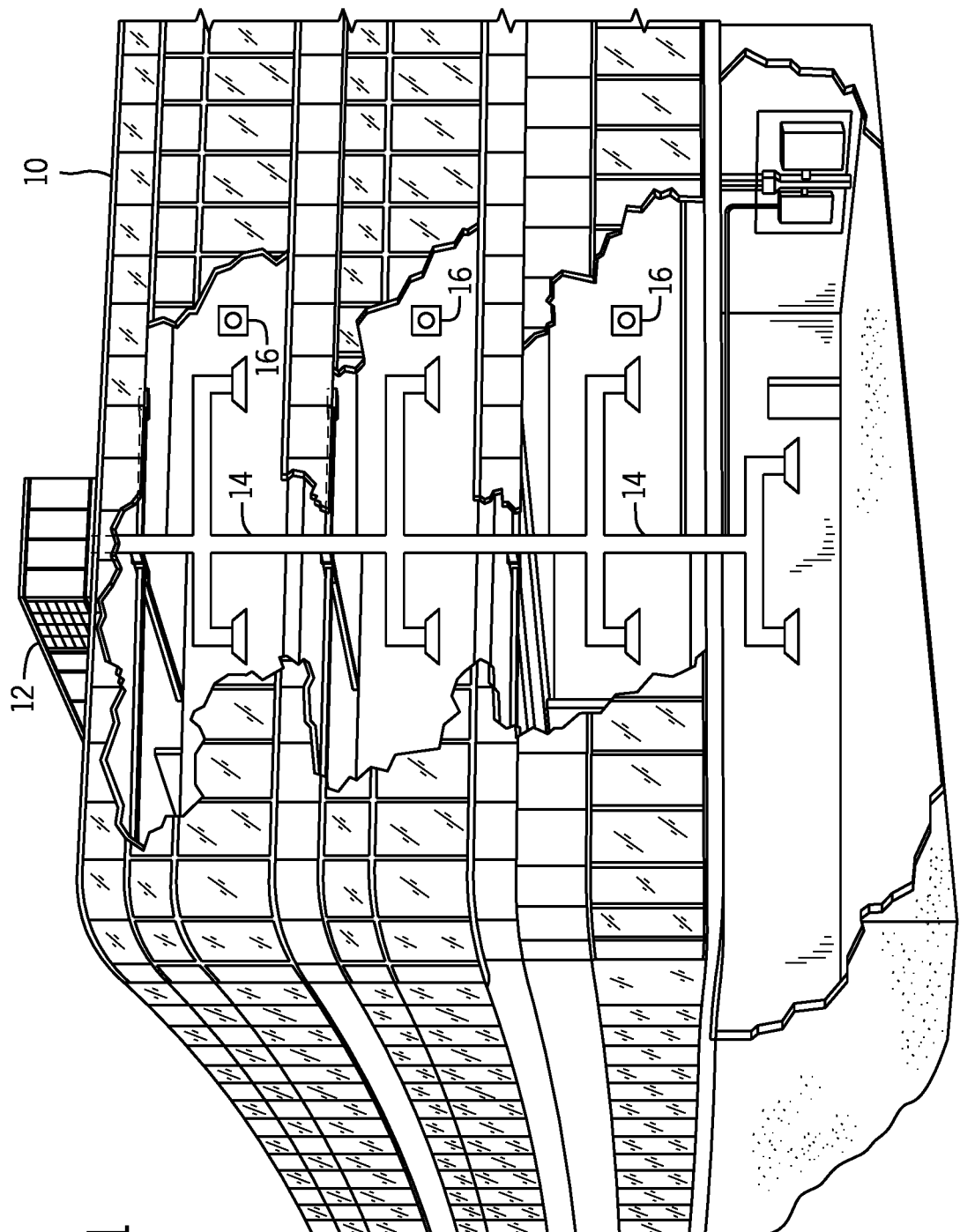
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices or equipment within the HVAC system, for example, implemented via one or more control boards or panels. That is, a control board may receive input data or signals from one or more devices in the HVAC system, such as an interface device, a thermostat, a sensor, another control board, or any combination thereof. Additionally or alternatively, a control board may output control commands or signals that instruct one or more other devices in the HVAC system to perform control actions. For example, a control board may receive a temperature set point via a thermostat, compare the temperature set point to a temperature measurement received from a sensor, and instruct equipment in the HVAC system to adjust operation when the temperature measurement deviates from the temperature set point by more than a threshold amount.

To adjust operational parameters and/or properties, such as temperature and/or air flow, of the HVAC system, an HVAC control system may be communicatively and/or electrically coupled to different components within the HVAC system via one or more input/output (I/O) ports and control the respective operations of the different components. In some embodiments, the HVAC control system may include an interface that receives commands from a user. After receiving the commands, the HVAC control system may adjust certain operational parameters of the HVAC system based on the commands.

As mentioned above, the HVAC system may control air flow directed or provided to different parts of a building, for example, organized as one or more building zones. When initializing or testing the effectiveness of the HVAC system in each zone of the structure, a technician may provide a test mode command, such as an air flow setting, to the HVAC control system and physically move to the respective zone to determine the effectiveness of the HVAC system in the respective zone. If not satisfied with the heating and ventilation of the respective zone, the technician may return to the location of the HVAC control system to adjust the operational parameters, for example, to adjust the air flow provided to the respective zone. The technician may then return to a respective location of the respective zone being tested to confirm whether the air flow or environmental properties are satisfactory. In some cases, the technician may repeat this process until the air flow to the respective zone is satisfactory. In large structures having multiple zones to test, this process can result in an inefficient use of the technician's time for fine tuning different zones of the structure.

With the foregoing in mind, in certain embodiments, the structure may include multiple zone control systems that communicate with the HVAC control system. As such, each zone control system may provide certain options to the technician to adjust the operations of the HVAC system via the respective zone control system and the HVAC control system. By way of example, the zone control system may include a processor that receives a request to adjust the air flow provided to a particular zone in the building. After receiving the request, the zone control system may relay the request to the HVAC control system, which may then adjust the respective operational parameters of the HVAC system accordingly. When satisfied with the air flow and conditions, the technician may send a command to the HVAC control system to store the current air flow setting and/or other operational parameters of the HVAC system, for example, as a profile for the respective zone. In addition to testing a single zone, the technician may use the zone control system to test the air flow and/or other operational parameters of the HVAC system when the HVAC system is providing heating or cooling services to multiple zones. As such, the technician may test a variety of permutations of activated zones or zones to which air flow is provided via the zone control system. Additional details with regard to controlling the operational parameters of the HVAC system via the zone control system will be discussed below with reference to FIGS. 1-8.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air-cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
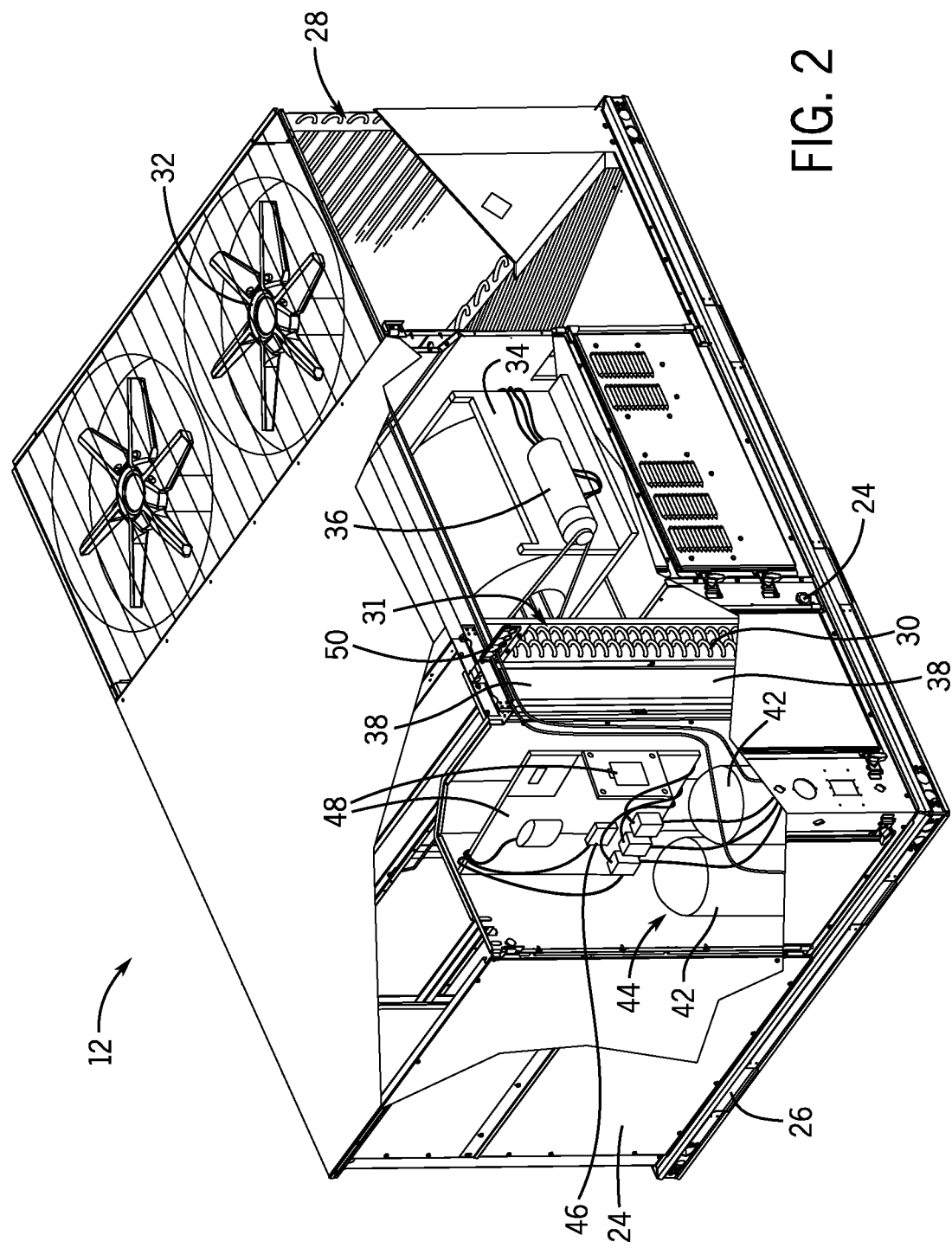
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 to provide structural support and/or protect the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements, such as rain, from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, may draw air through the heat exchanger 30 to heat or cool the air. The heated or cooled air may be directed to the building 10 by the ductwork 14, which is connected to the HVAC unit 12. Before flowing through the heat exchanger 30, the conditioned air flows through one or more filters, which may remove particulates and/or contaminants from the air. In certain embodiments, the filters may be disposed on the air intake side of the heat exchanger 30 to reduce likelihood of contaminants contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring may connect the control board 48 and the terminal block 46 to the equipment of the HVAC unit 12.

Figure 3:
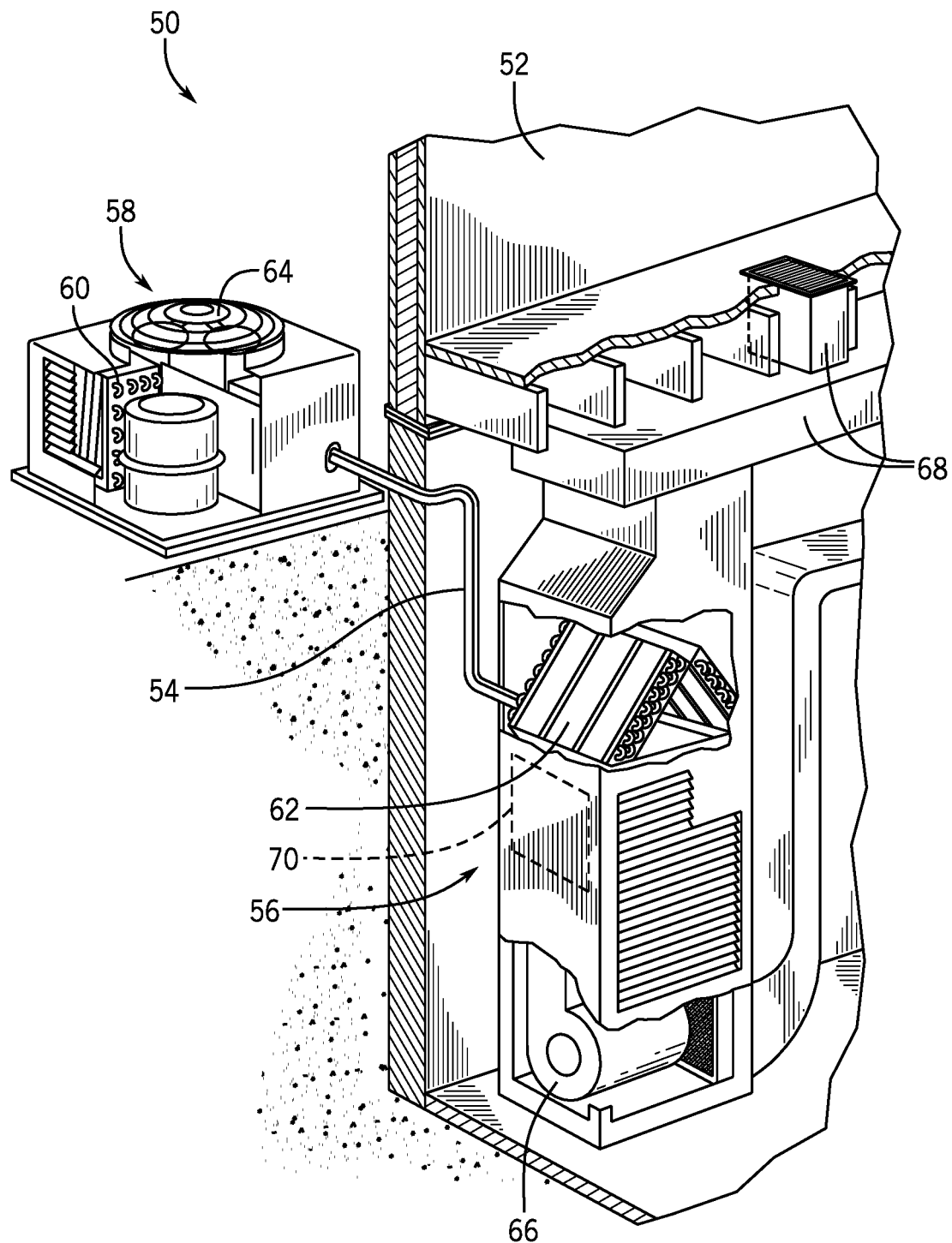
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated air to a residential structure, cooled air to the residential structure, outside air for ventilation, and/or improved indoor air quality (IAQ), for example, via devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 and the outdoor unit 58. The indoor unit 56 may be positioned in a utility room, an attic, a basement, and so forth. The outdoor unit 58 is typically situated adjacent to a side of the residence 52 and is covered by a shroud to protect the system components, for example, to prevent leaves, other debris, or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner or cooling mode, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 may draw environmental air through the heat exchanger 60 using a fan 64 and expel the air above the outdoor unit 58. When operating as an air conditioner, the air heated by the heat exchanger 60 within the outdoor unit 58 exits the unit at a temperature higher than it entered. The indoor unit 56 includes a blower or fan 66 that may direct air through or across the indoor heat exchanger 62, where the air is cooled when the system is operating in air conditioning mode. Thereafter, the air is passed through ductwork 68 that directs the air to the residence 52. The overall system operates to maintain a desired or target temperature as set by a system controller. When the temperature sensed inside the residence 52 is higher than the set point on the thermostat, or the set point plus a small amount, the residential heating and cooling system 50 may become operative to refrigerate or cool additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump or heating mode. When operating as a heat pump, the roles of heat exchangers 60 and 62 are reversed. That is, the heat exchanger 60 of the outdoor unit 58 may serve as an evaporator to evaporate refrigerant and thereby cool air entering the outdoor unit 58 as the air passes over outdoor the heat exchanger 60. Additionally, the indoor heat exchanger 62 may receive a stream of air blown over it and heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the fan 66 passes over the tubes or pipes and extracts heat from the combustion products. The heated air may then be routed from the furnace system 70 to the ductwork 68 for heating the residence 52.

Figure 4:
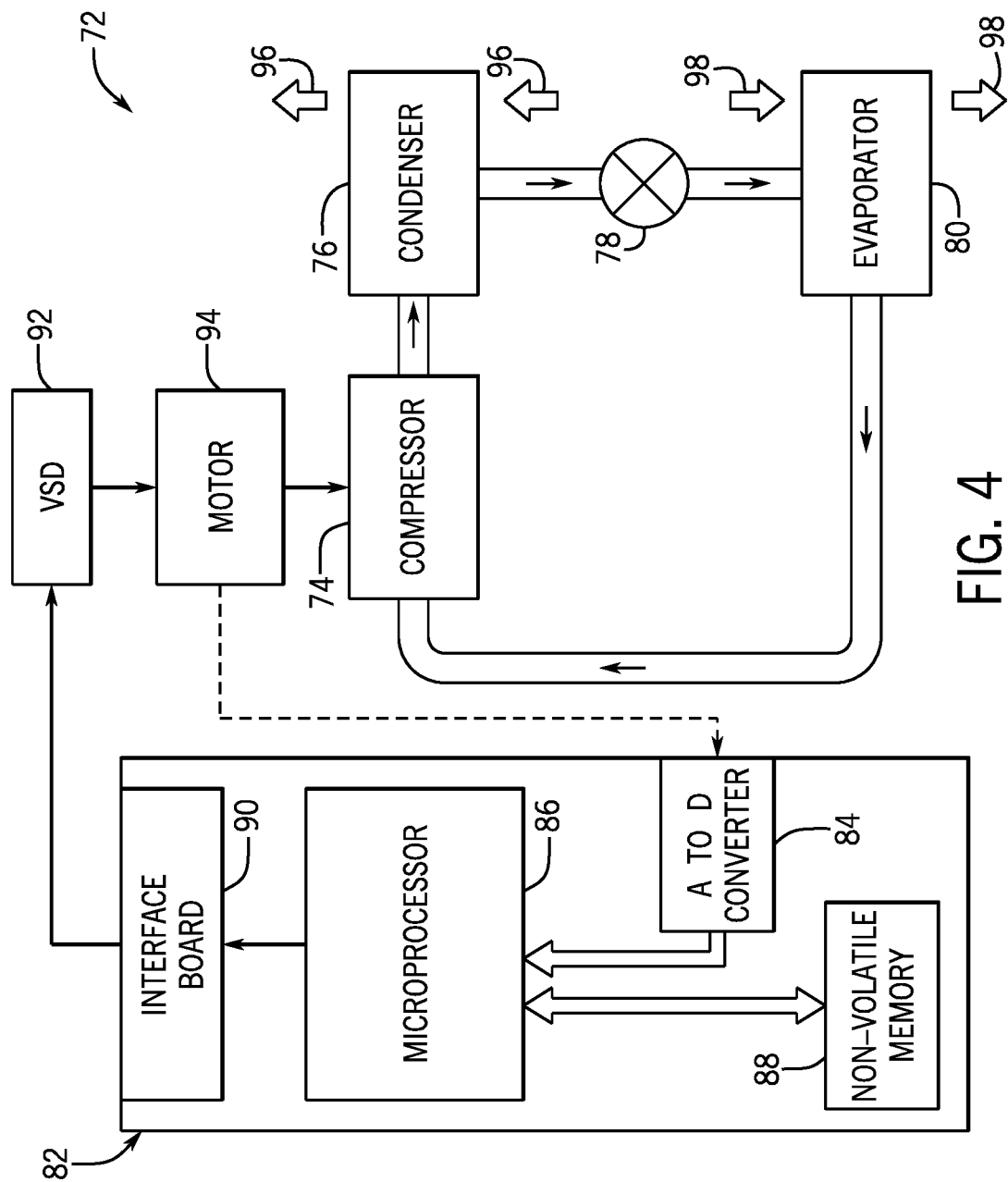
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, one or more expansion valves or devices 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback received from an operator, sensors of the vapor compression system 72 that detect operating conditions, and/or the like.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source and output electrical power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant may exit the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and reheat the supply air stream 98, for example, when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in more detail below, multiple control devices 16 may be disposed at different locations of the building 10. In certain embodiments, an HVAC control network 100 may include one particular control device 16, an HVAC control system 102 or zone panel, which may directly communicate with the control board 48 that controls the operation of the HVAC unit 12. That is, commands that adjust the operation of one or more HVAC units 12 may be input into the HVAC control system 102 and the HVAC control system 102 may relay or communicate the commands to the control board 48 of each respective HVAC unit 12. In some embodiments, a number of zone control systems 104, 106, 108 or zone thermostats may be communicatively coupled to the HVAC control system 102 to relay commands to the HVAC control system 102.

Figure 5:
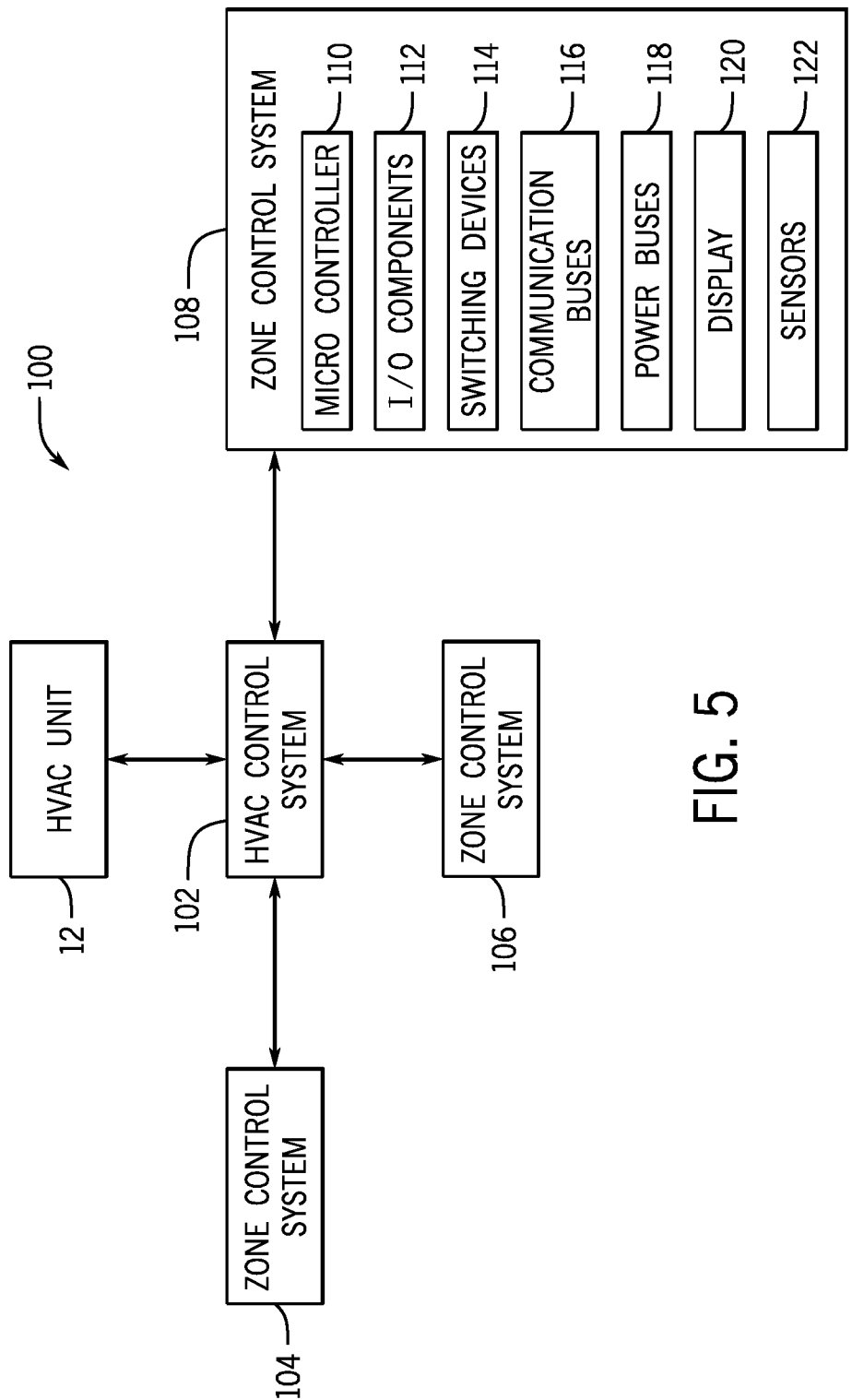
FIG. 5 is a block diagram of a HVAC control network implemented in the HVAC system of FIG. 1, in accordance with an embodiment of the present disclosure.

To help illustrate, the HVAC control network 100 including one or more zone control systems, which may be used to facilitate controlling operation of equipment in the HVAC unit 12, is shown in FIG. 5. In some embodiments, the zone control systems 104, 106, 108 and/or the HVAC control system 102 may each include one or more microcontrollers 110, one or more input/output (I/O) components 112, one or more switching devices 114, one or more communication buses 116, one or more power buses 118, one or more displays 120, one or more sensors 122, or any combination thereof. The microcontroller 110 may include processing circuitry, such as a field-programmable gate array (FPGA) or application-specific integrated circuit (ASIC) that operates, and/or a processor, such as microprocessor that executes instructions. Thus, in some embodiments, the zone control systems 104, 106, 108 and/or the HVAC control system 102 may each include memory, such as non-volatile memory or other tangible, non-transitory, computer readable media that stores instructions executable by the microcontroller 110, configuration data used to program circuit connections in the microcontroller 110, and/or data, such as operational parameters or user inputs, to be processed by the microcontroller 110.

The I/O components 112 may include a variety of input devices, such as a graphical user interface and/or keyboard, which enable a user to interact or control the operation of the zone control systems 104, 106, 108. In addition, the I/O components 112 may include output devices, such as a display, an annunciator, and/or a light, which provide an indication of operation of the zone control systems 104, 106, 108. The electronic display 120 may be any suitable electronic display device that may present visualizations regarding the operations of the respective zone control systems 104, 106, 108, the HVAC control system 102, or the HVAC unit 12. In some embodiments, the electronic display 120 may be a touch screen device capable of receiving inputs from a user to control the operation of the respective zone control systems 104, 106, 108, the HVAC control system 102, or the HVAC unit 12.

The sensors 122 may include any of the type of sensors mentioned above including a temperature sensor, a humidity sensor, an air flow sensor, and/or the like. In some embodiments, the readings or measurements acquired by the sensors 122 may be presented via the electronic display 120 or the like. Additionally or alternatively, the measurements acquired by the sensors 122 may be used to determine whether a particular zone is being effectively cooled or heated, for example, with reference to a temperature set point or target temperature received via a user input provided to the respective zone control system 104, 106, 108. Although three zone control systems 104, 106, 108 are illustrated in FIG. 5, it should be noted that any suitable number of zone control systems 104, 106, 108 may be incorporated into the HVAC control network 100.

Although the zone control system 104, 106, 108 is described has having certain components illustrated in FIG. 5, it should be noted that the zone control system 104, 106, 108 is not limited to having the components depicted in FIG. 5. Indeed, the zone control system 104, 106, 108 may include additional or fewer components illustrated in FIG. 5. In addition, the components described above and illustrated in FIG. 5 may also be replaced with other suitable components. For example, the communication buses 116 may be replaced with a communication component that facilitates wired and/or wireless communication protocols to enable the zone control system 104, 106, 108 to communicate with other devices, such as the HVAC control system 102, the HVAC unit 12, control devices 16, other zone control systems 104, 106, 108, and the like.

To coordinate the operation of the HVAC control system 102, the zone control system 104, 106, 108 may relay or send received commands to the HVAC control system 102. For the purposes of discussion, the following description of the operations of the HVAC control system 102 will be detailed from the perspective of zone control system 104, but it should be understood that any of the zone control systems 104, 106, 108 may perform the operations described herein.

Keeping this in mind, the zone control system 104 may receive an input via the I/O components 112 or the electronic display 120 to adjust the operation of the HVAC unit 12 with respect to a portion or zone of the building 10 that corresponds to the location of the zone control system 104. In certain embodiments, the zone control system 104 may be associated with a collection of settings for the HVAC unit 12, such as the speed of fans and/or the position of dampers to control the air flow to the respective zone. As such, an input received at the zone control system 104 may be associated with the settings for the HVAC unit 12 that control air flow to the respective zone.

Figure 6:
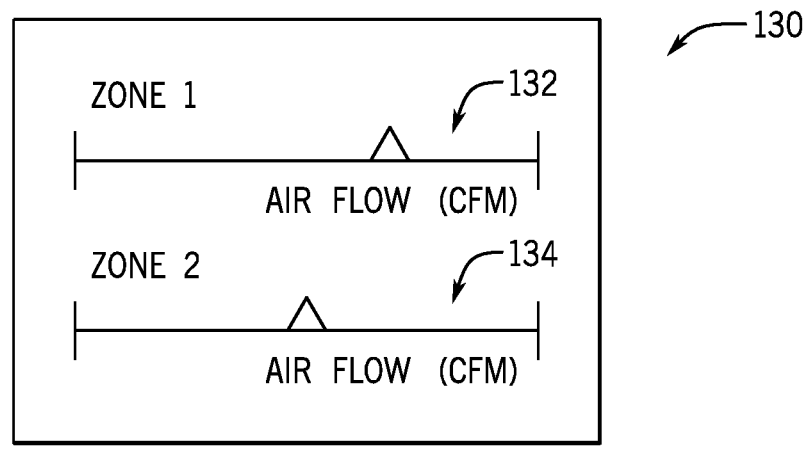
FIG. 6 illustrates an example visualization depicted by a control system implemented in the HVAC control network of FIG. 5, in accordance with an embodiment of the present disclosure.

When initializing or determining an appropriate setting for the HVAC unit 12, a user, such as a technician, may input an air flow setting into the I/O components 112 of the zone control system 104. In certain embodiments, the zone control system 104 may control the operations, such as air flow, of the HVAC unit 12 with respect to one or more zones in the building 10. By way of example, FIG. 6 illustrates an example visualization 130 that may be presented on an electronic display 120 of the zone control system 104 to facilitate controlling the air flow to zone 1 and zone 2 of the building 10. In one embodiment, the visualization 130 may include a control bar visualization 132 to adjust the air flow to zone 1 and a control bar visualization 134 to adjust air flow to zone 2. Each control bar visualization 130 and 132 may include an indicator visualization that represents a current air flow setting for the HVAC unit 12. After the zone control system 104 receives an input or command to adjust the air flow to the respective zone, the zone control system 104 may relay or send a command to the HVAC control system 102, which may be located in a different part or zone of the building 10 compared to the zone control system 104, to adjust the air flow to the respective zone.

As mentioned above, the zone control system 104 may be associated with a particular collection of settings for the HVAC unit 12. As such, the command transmitted by the zone control system 104 may include metadata or some indication with regard to the zone or zones of the building 10 that it controls. When the HVAC control system 102 receives the command, the HVAC control system 102 may determine the zone of the building to which the command pertains and send a command to the HVAC unit 12 to adjust settings, such as damper position and/or fan speed, based on the command received from the zone control system 104 and the associated settings of the HVAC unit 12. For example, if the zone control system 104 controls the air conditioning parameters of zone 1 in the building 10, after receiving the command from the zone control system 104, the HVAC control system 102 may associate the command with damper settings for the HVAC unit 12 to cause air flow to reach zone 1. As such, the HVAC control system 102 may send air flow commands and/or damper position commands based on the received command via the zone control system 104 to the HVAC unit 12, for example, to facilitate providing target air flow from HVAC unit 12 to zone 1.

In some embodiments, air flow to one zones may affect air flow to another zone in the building 30. That is, if one or more other zones are active or being supplied air from the HVAC unit 12 while zone 1 is being provided air from the HVAC unit 12, the amount of air flow provided to zone 1 may be different as compared to when the other zones are inactive. With this in mind, in some embodiments, the zone control system 104 may provide an indication of other active zones, for example, via its electronic display 120. In this manner, the technician setting the parameters of the HVAC unit 12 via the zone control system 104 may be aware of the other active zones, which, at least in some instances, may affect the air flow to the zone associated with the zone control system 104. In certain embodiments, as the technician adjusts the air flow to the respective zone via the zone control system 104, the HVAC control system 102 may associate the commands received via the zone control system 104 with a zone activity setting, for example, which indicates the currently active zones in the building 10. In this manner, the air flow to the respective zone may be replicated, for example, when the zone activity setting or a similar zone activity setting subsequently occurs. Moreover, if the zone activity setting changes, the technician may determine whether to adjust the air flow setting for the respective zone via the zone control system 104 for different permutations of active zones or different zone activity settings. In this manner, the respective zone may maintain a certain air flow or condition regardless of which zones in the building are active or not.

With the foregoing in mind, it may be difficult for the technician to determine which zones of the building 10 may affect the respective zone that is being configuring. In addition, the technician may not be aware of each zone of the building 10 or understand how each zone of the building 10 may or may not affect the air flow in the respective zone that is being configuring. As such, in certain embodiments, the zone control system 104 may provide the technician an indication of one or more zones that may affect the air flow to the respective zone, for example, via its electronic display 120. In addition, after determining the one or more zones that may affect the air flow to the respective zone, the technician may use the zone control system 104 to adjust the air flow settings for various zone activity settings or combinations of active zones, which may affect the air flow to the respective zone. In this way, the technician may test the air flow to the respective zone for various active zone combinations to ensure that the air flow provides sufficient air conditioning to the respective zone, for example, regardless of which zones are active. In addition, the technician may adjust the air flow to the respective zone to conserve power consumed by the HVAC unit 12, for example, when the air flow to the respective zone is higher than an air flow threshold due to air being supplied to the other active zones.

Figure 7:
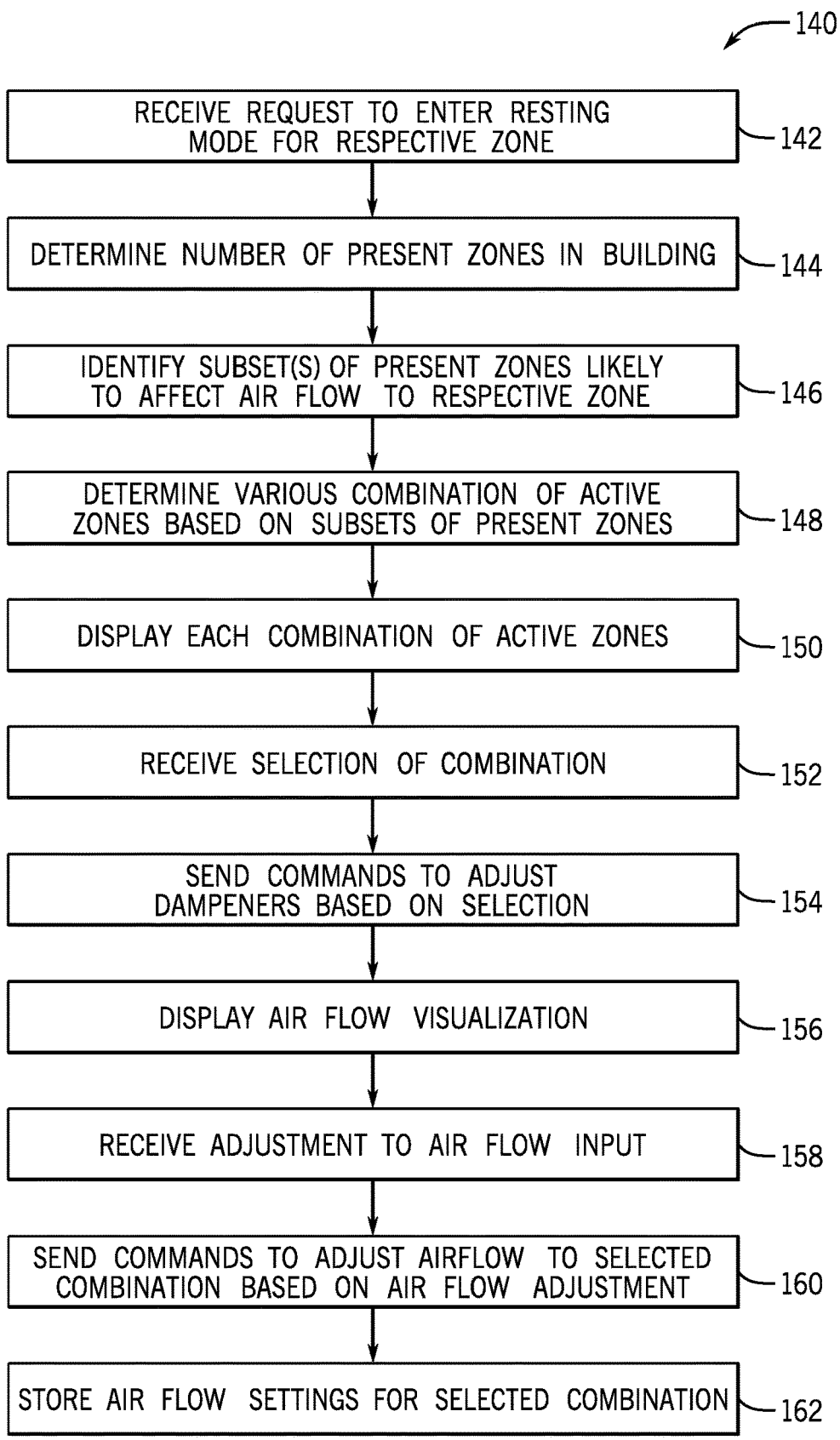
FIG. 7 is a flow diagram of a process for controlling air flow in one or more zones of a building, in accordance with an embodiment of the present disclosure.

FIG. 7 illustrates an example flow chart of a method 140 for adjusting the air flow parameters or settings of a respective zone via the zone control system 104. Although the following description of the method 140 is described in a particular order, it should be understood that the method 140 may be performed in any suitable order and may forgo certain process steps. In addition, although the method 140 is described as being performed by the zone control system 104, it should be noted that any suitable zone control system 104, 106, 108 may perform the method 140.

Referring now to FIG. 7, at block 142, the zone control system 104 may receive a request to enter a testing mode for the respective zone controlled by the zone control system 104. The testing mode may enable the zone control system 104 to receive inputs that cause the HVAC unit 12 to adjust its operations, for example, to adjust output air flow. In addition, the testing mode may cause the zone control system 104 to present visualizations via the electronic display 120 representative of the current parameter settings for the HVAC unit 12, the zones that are currently active or currently receiving air flow in the building 10, the measurements acquired by the sensors 122, and/or the like. The request to enter the testing mode may be received by the zone control system 104 via an input provided by a user via an I/O component 112, the electronic display 120, and/or the like.

At block 144, the zone control system 104 may determine a number of zones that are present in the building 10. In one embodiment, the zone control system 104 may send a request for an indication of the number of zones in the building 10 to the HVAC control system 102, which may store information regarding the building 10 and the zones therein, for example, in memory. In some embodiments, the HVAC control system 102 may determine a number of zone control systems 104, 106, 108 that are communicatively coupled to itself to ascertain the number of zones present in the building 10.

Additionally or alternatively, the zone control system 104 may consult another data source, such as a data repository or database, which includes information regarding the heating and air conditioning design plans for the building 10. In some embodiments, the data source may be a memory component directly accessible to the zone control system 104. Additionally or alternatively, the data source may be a separate data source that is communicatively coupled to the zone control system 104 or the HVAC control system 102 via a wired or wireless network.

In any case, after determining the number of zones present in the building 10, at block 146, the zone control system 104 may identify a subset of the zones, which may or are expected to affect the air flow of the respective zone. The subset of the zones may include zones that share the same ductwork or are otherwise fluidly coupled. In general, the subset of zones may be identified based on whether the air flow from the HVAC unit 12 to the respective zone can be affected by positions of one or more dampers in the respective ductwork.

After identifying the subset of zones that may affect the airflow to the respective zone, at block 148, the zone control system 104 may determine various zone activity settings or combinations of zones that may be active at various times based on the identified subset of zones. That is, since the air flow to the respective zone may be affected due to the air flow provided to other zones fluidly coupled to the respective zone, the zone control system 104 may determine the combinations in which the subset of zones may be active or receiving air flow. The various combinations of active zones may be presented to a user, at block 150, for example, via the electronic display 120.

Figure 8:
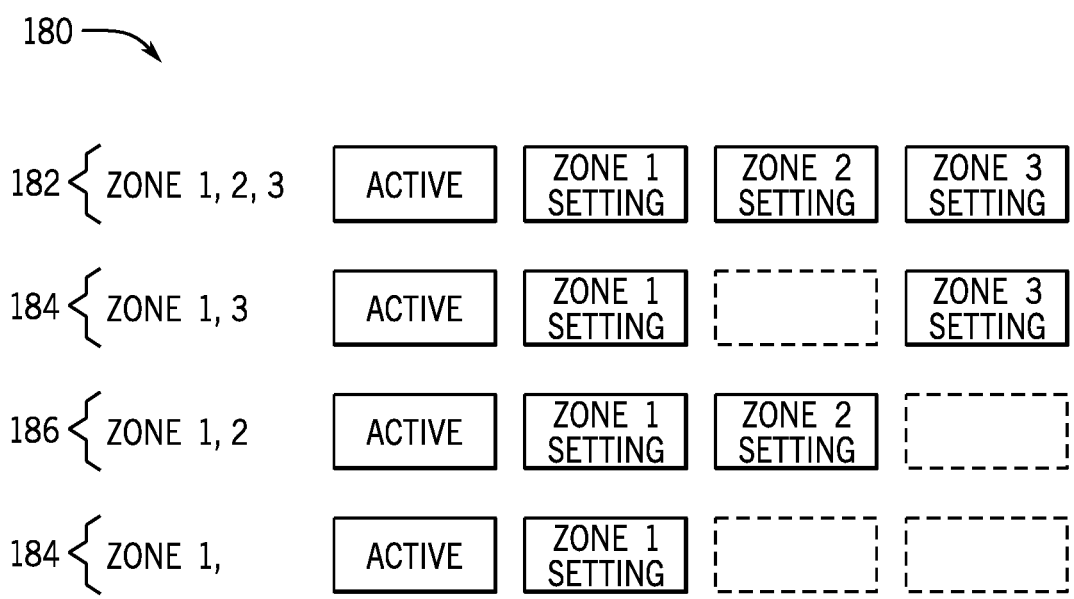
FIG. 8 illustrates an example visualization of different combinations of zones that can be activated via the zone control system, in accordance with an embodiment of the present disclosure.

FIG. 8 illustrates an example visualization 180 of a sample combination of zones that may affect the air flow to a respective zone. By way of example, the zone controls system 104 may be affiliated with the air flow to zone 1. During the operation, the zone control system 104 may identify zones 2 and 3 as other zones that may affect air flow to zone 1. As such, at block 150, the zone control system 104 may generate and present the visualization 180 via the electronic display 120, as shown in FIG. 8.

In the example visualization 180 depicted in FIG. 8, each possible combination of active zones with zone 1 also being active is presented. For instance, row 182 indicates that zones 1, 2, and 3 are all active or receiving air flow from the HVAC unit 12. Row 184 indicates that zones 1 and 3 are active, row 186 indicates that zones 1 and 2 are active, and row 184 indicates that just zone 1 is active.

Returning now to the method 140 of FIG. 7, after presenting the various combination of zones that may be active along with the respective zone, at block 152, the zone control system 104 may receive a selection of one of the combination of zones presented at block 150. In response to receiving the selection, the zone control system 104 may, at block 154, send one or more commands to the HVAC control system 102 to adjust one or more damper positions to control air flow from the HVAC unit 12 to the active zones of the selected combination. For example, if the zone control system 104 receives an input identifying a zone activity setting corresponding with row 182 in the visualization 180 of FIG. 8, the zone control system 104 may send a command to the HVAC control system 102 to adjust the dampers, such that zones 1, 2, and 3 will receive air from the HVAC unit 12.

After receiving the commands to adjust the damper positions, the HVAC control system 102 may send corresponding commands to the HVAC unit 12 to adjust the respective damper positions. As a result, each zone of the selected combination will receive air flow from the HVAC unit 12. At block 156, the zone control system 104 may present a visualization indicative of the current air flow setting for the HVAC unit 12, for example, via the electronic display 120. For example, the zone control system 104 may present the visualization 130 of FIG. 6 to illustrate the current air flow of each active zone, for example, as detected by air flow sensors. While physically located in the respective zone, the technician may determine whether the air flow is causing the condition of the respective zone to be suitable and choose to adjust the air flow setting of the HVAC unit 12 via the zone control system 104 located in the respective zone, for example, when the condition of the respective zone deviates from a target condition.

With this in mind, at block 158, the zone control system 104 may receive an input that corresponds to adjustment to the air flow, for example, via the I/O components 112 and/or the electronic display 120. In some embodiments, the zone control system 104 may receive an input indicative of an adjustment to the air flow of the HVAC unit 12 for the current positions of the dampers. At block 160, the zone control system 104 may send a command to the HVAC control system 102 to adjust the air flow settings of the HVAC unit 12 based on the received command.

In some embodiments, the zone control system 104 may repeat blocks 156-160 until the technician is satisfied with the condition of the respective zone. In other embodiments, the zone control system 104 may automatically perform blocks 156-160 based on whether sensor data representative of a condition, such as temperature and/or humidity, of the respective zone meets a target condition. For example, after sending the commands to adjust damper position at block 154, the zone control system 104 may receive data from temperature sensors or air flow sensors disposed in the respective zone. If the data is greater than a threshold value or the change in the data over a certain amount of time is less than a threshold value, the zone control system 104 may automatically send adjustment commands that instruct the HVAC control system 102 provided by the HVAC unit 12.

After the technician identifies a suitable air flow setting of the HVAC unit 12 or after the zone control system 104 determines that a sensor measurement meets a target condition, at block 162, the zone control system 104 may store air flow settings for the selected combination of active zones. That is, the zone control system 104 may store data regarding the damper positions, the active zones, and the adjusted air flow settings, which may be associated with a particular air flow setting for the respective zone. In addition, the zone control system 104 may store any sensor data acquired in relation to the damper positions. In this way, the HVAC unit 12 may be calibrated to provide target air flow to a respective zone for the respective combination of active zones. With this in mind, blocks 154-162 may be repeated for each of the combination of zones identified by the zone control system 104 to ensure that a sufficient amount of air flow is being provided to the respective zone for each combination of active zones.

After the data is stored at block 162, the zone control system 104 may request to change the temperature of the respective zone, for example, based on user inputs that adjust the target temperature of the respective zone. In response to receiving the request, the zone control system 104 may determine which zones are currently active. Based on the currently active zones and whether the temperature of the respective zone is above or below the requested temperature, the zone control system 104 may determine an air flow setting for the HVAC unit 12 using data stored after completion of block 162. In this way, the HVAC unit 12 may provide a sufficient amount of air flow to the respective zone in light of the active zones.

By providing the ability to control the operations of the HVAC unit 12 via the HVAC control system 102 and the zone control system 104, the present embodiments described herein may enable a technician to initialize or adjust air flow settings for different zones directly from a respective zone control system 104 located in the respective zone in which the technician is located. In addition, since different zones may affect the air flow to the respective zone, the present embodiments described herein may also assist the technician in identifying different zones that may affect the air flow to the respective zone and allow the technician to provide an air flow setting to the HVAC unit 12 for each combination of active zones. In this way, each zone in the building may receive a desired or target air flow from the HVAC unit 12 regardless of the combination of active zones. As such, the technician may initialize the air flow settings for the HVAC unit 12 in an efficient manner, for example, without physically moving to different zones of the building 10 while, nevertheless, accounting for different zones that may affect the air flow to the respective zone.

In addition to controlling the operations of the HVAC unit 12 the zone control system 104 described above, it should be noted that in some embodiments, the zone control system 104 may be embodied in any suitable computing device such as a general-purpose computer, a tablet computing device, a mobile computing device, and the like. That is, a mobile zone control system 104 may perform similar operations described above and communicate with the HVAC control system 102 via wired or wireless networks using one or more communication protocols (e.g., near-field communication, Bluetooth®, Internet, local network, etc.). In some embodiments, the mobile zone control system 104 may communicate directly with the HVAC control system 102 or directly with the HVAC unit 12 to adjust the operations of the HVAC unit 12. Additionally, the mobile zone control system 104 may use control devices 16 (e.g., thermostats) to route commands and changes to the HVAC control system 102 or the HVAC unit 12 via the control devices 16. For example, the mobile zone control system 104 may perform the method 140 or other processes described herein and send commands to adjust air flow settings to the HVAC unit 12 via wired or wireless transmission of the commands to the HVAC control unit 14, the HVAC unit 12, the control devices 16, or the like. In this way, the technician initializing or adjusting the air flow settings of the HVAC unit 12 may have the ability to move around in the building 10 and test and adjust the air flow in each portion of the building 10 while physically being present the portion of the building 10 being tested.

Moreover, the air flow settings may be stored in a database or within the storage or memory of the mobile zone control system 14 to allow the technician to remotely view the settings for each combination of zones. That is, since the HVAC unit 12, the HVAC control system 12, the control devices 16, and other components in the building 10 may be communicatively coupled to a network (e.g., Internet), the air flow settings may be adjusted via the mobile zone control system 14 from inside or outside the building 10. Indeed, a technician may remotely test certain air flow settings with an occupant of the building 10 while conversing with the occupant via the phone, text message, social media, communication software, and the like. The remote access to the air flow settings may help the technician ascertain whether an issue is present in the air flow settings or elsewhere with regard to the operation of the HVAC unit 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and air conditioning (HVAC) system comprising:
    a HVAC unit configured to control air flow to be supplied to a plurality of zones of a building;
    a first control system configured to directly control operation of equipment in the HVAC unit;
    a second control system communicatively coupled to the first control system, wherein the second control system is located in a different zone of the plurality of zones as compared to the first control system, wherein the second control system is configured to:
        receive a request to adjust the air flow output by the HVAC unit; and
        send a command to the first control system based on the request, wherein the command is configured to cause the first control system to adjust the operation of the equipment in the HVAC unit to cause the air flow output by the HVAC unit to be adjusted according to the request.

2. The HVAC system of claim 1, wherein the second control system is configured to:
    identify one or more zones of the plurality of zones that are fluidly coupled to a respective zone of the building associated with the second control system; and
    generate a visualization comprising the one or more zones for display via an electronic display of the second control system.

3. The HVAC system of claim 2, wherein the second control system is configured to identify the one or more zones of the plurality of zones based on data comprising a design of ductwork for the HVAC system.

4. The HVAC system of claim 2, wherein the visualization comprises one or more combinations of the one or more zones of the plurality of zones and the respective zone.

5. The HVAC system of claim 4, wherein the second control system is configured to:
    receive a selection of the one or more combinations; and
    send a second command to the first control system to cause the HVAC unit to adjust one or more positions of one or more dampers based on the selection.

6. The HVAC system of claim 5, wherein the second control system is configured to:
    receive a second request to adjust the air flow output by the HVAC unit after the one or more positions of the one or more dampers are adjusted; and
    store data comprising the second request and the one or more positions in a storage component.

7. The HVAC system of claim 5, wherein the second control system is configured to:
    determine whether a respective air flow of the respective zone is below a threshold based on sensor data acquired from a sensor disposed in the respective zone;
    send a second request to adjust the air flow output by the HVAC unit to the first control system in response to the respective air flow being below the threshold; and
    store data comprising the second request, the sensor data, and the one or more positions in a storage component.

8. The HVAC system of claim 7, wherein the first control system is communicatively coupled the second control system via a wireless network.

9. The HVAC system of claim 1, wherein the operation of the equipment comprises one or more positions of one or more dampers, a speed of a fan, or both.

10. A method for controlling operation of equipment of a heating, ventilation, and air conditioning (HVAC) system, comprising:

receiving, via at least one processor, a request to adjust an air flow provided to a first zone in a building from the HVAC system;

determining, via the at least one processor, one or more zones of the building fluidly coupled to the first zone via ductwork, wherein one or more dampers are implemented in the ductwork;

generating, via the least one processor, a visualization indicative of one or more combinations of the first zone and the one or more zones;

receiving, via the least one processor, a selection of the one or more combinations of the first zone and the one or more zones;

sending, via the least one processor, a command to an HVAC control system to adjust position of the one or more dampers based on the selection;

receiving, via the least one processor, an air flow input associated with the first zone;

sending, via the least one processor, the air flow input to the HVAC control system to enable the HVAC control system to adjust an air flow output by the HVAC system based on the air flow input; and storing, via the least one processor, data comprising the air flow input and the selection of the one or more combinations of the first zone and the one or more zones in a storage component.

11. The method of claim 10, comprising:

receiving, via the least one processor, a second selection of the one or more combinations of the first zone and the one or more zones; and sending, via the least one processor, a second command to the HVAC control system to adjust the position of the one or more dampers based on the second selection;

receiving, via the least one processor, a second air flow input associated with the first zone;

sending, via the least one processor, the second air flow input to the HVAC control system to enable the HVAC control system to adjust the air flow output by the HVAC system based on the second air flow input; and storing, via the least one processor, additional data comprising the second air flow input and the second selection of the one or more combinations of the first zone and the one or more zones in the storage component.

12. The method of claim 10, wherein the HVAC control system is located in a different zone as compared to the first zone.

13. The method of claim 10, comprising instruct, via the least one processor, an electronic display to display the visualization.

14. The method of claim 13, wherein the selection is received via the electronic display, and wherein the air flow input is received via the electronic display.

15. The method of claim 10, comprising sending, via the least one processor, the command directly to the HVAC system to adjust the position of the one or more dampers based on the selection.

16. A tangible, non-transitory, computer-readable medium that stores instructions executable by one or more processors of a zone control system in a heating, ventilation, and air conditioning (HVAC) system that, when executed by the one or more processor, cause the one or more processors to:

receive a request to adjust an air flow output by an HVAC unit of the HVAC system, wherein the HVAC unit is fluidly coupled and configured to supply air to a plurality of zones in a building via ductwork and one or more dampers are implemented in the ductwork; and send a command to the HVAC unit, a control device communicatively coupled to the HVAC unit, or to an HVAC control system directly communicatively coupled to the HVAC unit based on the request to adjust the air flow output by the HVAC unit, wherein the command is configured to cause the air flow output by the HVAC unit to be adjusted according to the request, wherein the air flow output is associated with a speed of a fan in the HVAC unit and the zone control system is located in a different zone of the plurality of zones as compared to the HVAC control system.

17. The computer-readable medium of claim 16, wherein the instructions, when executed by the one or more processors, cause the one or more processors to receive the request via an electronic display that displays a visualization indicative of a current air flow setting of the HVAC unit.

18. The computer-readable medium of claim 16, wherein the instructions, when executed by the one or more processors, cause the one or more processors to:

identify a subset of zones from the plurality of zones in the building that is each fluidly coupled to a respective zone of the plurality of zones associated with the zone control system; and generate a visualization comprising the subset of zones for display via an electronic display of the zone control system.

19. The computer-readable medium of claim 18, wherein the instructions, when executed by the one or more processors, cause the one or more processors to:

receive a selection indicative of a first zone of the subset of zones and the respective zone; and send a second command to the HVAC control system based on the selection to enable the HVAC control system to adjust position of the one or more dampers implemented in the ductwork fluidly coupled to the HVAC unit to cause the air flow output by the HVAC unit to be provided to the first zone and the respective zone.

20. The computer-readable medium of claim 16, wherein the zone control system is communicatively coupled to the HVAC control system via a wireless network.

* * * * *